United States Patent
Zaremba (10) Patent No.: US 10,077,786 B2
(45) Date of Patent: Sep. 18, 2018

(54) INLET SIEVE FOR SELF-PRIMING FLOATING PUMPS

(71) Applicant: Gary W. Zaremba, Regina (CA)

(72) Inventor: Gary W. Zaremba, Regina (CA)

( * ) Notice: Subject to any disclaimer, the term of this patent is extended or adjusted under 35 U.S.C. 154(b) by 430 days.

(21) Appl. No.: 14/684,804

(22) Filed: Apr. 13, 2015

(65) Prior Publication Data
US 2015/0308433 A1    Oct. 29, 2015

Related U.S. Application Data (60) Provisional application No. 61/985,804, filed on Apr. 29, 2014.

(51) Int. Cl.
| | |
|---|---|
| *F04D 29/70* | (2006.01) |
| *F04D 13/06* | (2006.01) |
| *F04D 9/02* | (2006.01) |
| *B01D 33/06* | (2006.01) |
| *B01D 33/27* | (2006.01) |
| *B01D 35/26* | (2006.01) |
| *B01D 33/15* | (2006.01) |
| *B01D 33/23* | (2006.01) |

(52) U.S. Cl.
CPC .......... *F04D 29/708* (2013.01); *B01D 33/06* (2013.01); *B01D 33/155* (2013.01); *B01D 33/23* (2013.01); *B01D 33/27* (2013.01); *B01D 35/26* (2013.01); *F04D 9/02* (2013.01); *F04D 13/066* (2013.01)

(58) Field of Classification Search
CPC . F04D 9/02; F04D 13/06; F04D 29/70; F04D 29/708; F04D 13/066; B01D 33/06; B01D 33/155; B01D 33/21; B01D 33/23; B01D 33/27; B01D 35/26
See application file for complete search history.

(56) References Cited

U.S. PATENT DOCUMENTS

| | | | | |
|---|---|---|---|---|
| 1,920,371 | A * | 8/1933 | Franke | ................... H02K 5/132 |
| | | | | 210/242.1 |
| 2,924,179 | A * | 2/1960 | Isaksson | ............... F04D 29/708 |
| | | | | 210/460 |
| 3,273,507 | A * | 9/1966 | Handford | .............. F04D 13/066 |
| | | | | 210/923 |
| 3,400,664 | A | 9/1968 | Kingsep | |
| 3,461,807 | A | 8/1969 | Morrison | |
| 3,470,822 | A | 10/1969 | Evans et al. | |
| 3,612,721 | A | 10/1971 | Evans et al. | |

(Continued)

*Primary Examiner* — Bryan Lettman
(74) *Attorney, Agent, or Firm* — Kyle R Satterthwaite; Ryan W Dupuis; Ade & Company Inc.

(57) ABSTRACT

An inlet sieve for a self-priming floating pump features a bottom wall that is carried in a position that underlies the inlet of the self-priming floating pump at a distance therebelow with the inlet of the pump aligned with an axis that passes through the bottom wall of the sieve. A perforated outer wall of the sieve stands upward from a top side of the bottom wall and extends about the axis. The bottom wall features an outer area that spans inwardly from the perforated outer wall toward the axis, and a protuberance that bulges upwardly from the outer area to an apex of the protuberance that is situated at the axis. Water flowing inwardly toward the protuberance from different radial directions is directed smoothly upward into the inlet of the pump with minimal turbulence in order to optimize the performance of the pump.

19 Claims, 4 Drawing Sheets

(56) References Cited

U.S. PATENT DOCUMENTS

| | | |
|---|---|---|
| 3,619,075 A | 11/1971 | Chmela et al. |
| 3,762,557 A | 10/1973 | Tudor et al. |
| 4,553,902 A | 11/1985 | Eberhardt |
| 2005/0039907 A1* | 2/2005 | Madison .................. E03B 3/15 166/67 |

* cited by examiner

INLET SIEVE FOR SELF-PRIMING FLOATING PUMPS

CROSS REFERENCE TO RELATED APPLICATIONS

This application claims benefit under 35 U.S.C. 119(e) of Provisional Application Ser. No. 61/985,804, filed Apr. 29, 2014.

FIELD OF THE INVENTION

The present invention relates generally self-priming floating pumps that operate to pump liquid from a body of liquid on which they are placed, and more particularly to an improved inlet sieve for same that not only protects from the pump from debris carried in the body of liquid, but also encourages smooth intake of liquid to the pump to optimize the performance of same.

BACKGROUND

A number of different pumps of the aforementioned type have been patented and commercialized in the prior art for the purpose of pumping water from a body of water on which the pump is deployed. In their basic form, each such pump comprise an engine or motor mounted atop a pump housing containing an impeller that is rotatably driven by a vertical drive shaft from the engine. An inlet opening of the pump housing via which liquid is drawn into the pump from the body of water is situated at a bottom end of the pump housing, and an outlet through which the liquid is discharged is oriented generally radially of the vertical rotational axis of the impeller.

Such pumps are useful in disaster relief applications (e.g. removing flood waters), oilfield applications, construction applications, forestry/firefighting applications, and agricultural applications such as draining of sloughs, supplying of water to livestock, irrigating of farmland or removal of water from flooded areas, although other industries such as forestry and construction can likewise benefit from use of such pumps.

Examples of prior art self-priming floating pumps are found in U.S. Pat. No. 1,920,371 of Franke, U.S. Pat. No. 3,461,807 of Morrison, U.S. Pat. No. 3,400,664 of Kingsep, U.S. Pat. Nos. 3,470,822 and 3,612,721 of Evans et al., U.S. Pat. No. 3,619,075 of Chmela et al., U.S. Pat. No. 3,762,557 of Tudor et al., and U.S. Pat. No. 4,553,902 of Eberhardt.

Among these prior pump designs, it is known to use a generally pan-shaped inlet sieve with a circular bottom wall and a perforated circumferential wall upstanding from the bottom wall around the perimeter thereof to prevent water-carried debris from entering the pump inlet and causing damage to the pump. The top of the circumferential wall is attached to the underside of the pump body around the central inlet opening that feeds into the impeller chamber, and the openings in the circumferential wall allow water to reach the pump inlet but are sized to prevent entry of larger debris.

As water is drawn into the sieve in different radial directions through the circumferential wall, impact of these different directional flows with one another beneath the pump inlet many introduce unwanted turbulence that interferes with smooth intake by the pump. In addition, notable energy may be consumed by relying on the pump as the sole tool for redirecting the horizontally-inflowing water streams upwardly into the impeller chamber of the pump.

Applicant has developed a unique inlet sieve design to address these issues to provide smoother and less energy intensive water intake, and thereby improve pump performance and efficiency.

SUMMARY OF THE INVENTION

According to one aspect of the invention, there is provided an inlet sieve for a self-priming floating pump, the inlet sieve comprising:
 a bottom wall; and
 a perforated outer wall upstanding from a topside the bottom wall;
 wherein the bottom wall comprises an outer area spanning inwardly from the perforated outer wall toward the axis, and a protuberance that bulges upwardly from the outer area on an axis that passes through said bottom wall at a position spaced across said outer area from the perforated outer wall.

According to another aspect of the invention, in combination with a self-priming floating pump having a pump body and an inlet opening at an underside thereof that communicates with an impeller chamber of the pump to draw liquid into and through the impeller chamber under operation of the pump when floating in a body of said liquid, there is provided an inlet sieve comprising:
 a bottom wall; and
 a perforated outer wall upstanding from a topside the bottom wall and extending about an axis that passes through the bottom wall;
 wherein the inlet sieve is connectable to the pump in a position placing a bottom wall beneath the inlet of the pump at a distance therebelow with the inlet of the pump aligned with the axis, whereupon openings in said perforated outer wall enable liquid to flow into a space bound between the bottom wall of the inlet sieve and the underside of the self-priming floating pump for uptake of said liquid into the inlet opening of the self-priming floating pump; and
 wherein the bottom wall of the inlet sieve comprises an outer area spanning inwardly from the perforated outer wall toward the axis, and a protuberance that bulges upwardly from the outer area to an apex of the protuberance that is situated at the axis, whereby the liquid flowing into the space between the bottom wall and the underside of the self-priming floating pump is guided upwardly into the inlet opening of the self-priming floating pump by the protuberance of the bottom wall of the inlet sieve.

According to yet another aspect of the invention, in a self-priming floating pump having a pump body and an inlet opening at an underside thereof that communicates with an impeller chamber of the pump to draw liquid into and through the impeller chamber under operation of the pump when floating in a body of said liquid, there is provided an inlet sieve comprising:
 a bottom wall in a position underlying the inlet of the self-priming floating pump of at a distance therebelow with the inlet of the self-priming floating pump aligned with an axis that passes through said bottom wall; and
 a perforated outer wall upstanding from a topside the bottom wall and extending about the axis,
 wherein the bottom wall comprises an outer area spanning inwardly from the perforated outer wall toward the axis, and a protuberance that bulges upwardly from the outer area to an apex of the protuberance that is situated at the axis.

In any of the forgoing aspects of the invention, preferably the outer area of the bottom wall and the protuberance thereof are seamlessly integral with one another.

In any of the forgoing aspects of the invention, preferably the protuberance is circular in shape around the axis.

In any of the forgoing aspects of the invention, preferably the protuberance comprises a smoothly curved continuous transition from the outer area of the bottom wall.

In any of the forgoing aspects of the invention, preferably an outer circumference of the protuberance spans 360-degrees about the axis.

In any of the forgoing aspects of the invention, preferably cross-section of the protuberance is identical in each of a plurality of diametral planes of the axis.

Preferably the cross-section of the protuberance is identical in each and every diametral plane of the axis.

In any of the forgoing aspects of the invention, preferably, a slope profile of the protuberance facing outwardly away from the axis on opposing sides thereof is identical in each of a plurality of diametral planes of the axis.

Preferably the slope profile of the protuberance is identical in each and every diametral plane of the axis.

In any of the forgoing aspects of the invention, the bottom wall may have an axial opening therein at the apex of the protuberance.

BRIEF DESCRIPTION OF THE DRAWINGS

Preferred embodiments of the invention will now be described in conjunction with the accompanying drawings in which.

In the drawings like characters of reference indicate corresponding parts in the different figures.

DETAILED DESCRIPTION

Figure 1:
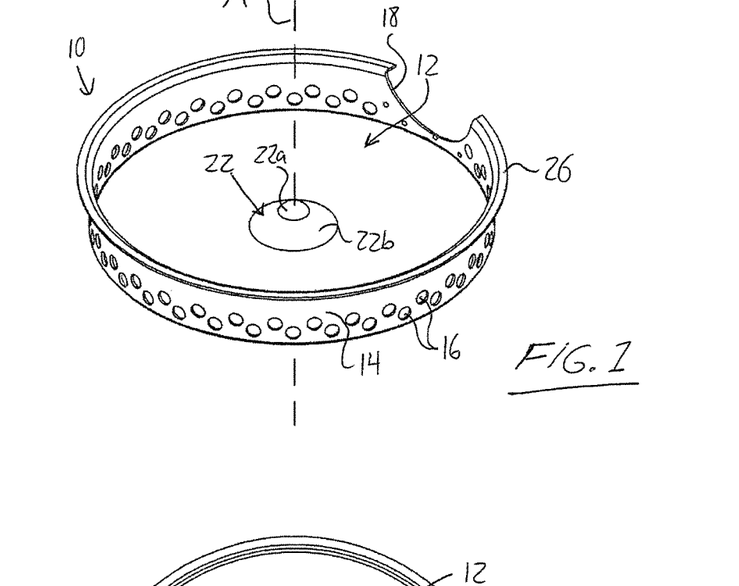
FIG. 1 is a perspective view of a floating pump inlet sieve of a first embodiment of the present invention.

FIG. 1 shows an inlet sieve 10 of the present invention for use on a self-priming floating pump. The sieve is generally pan-shaped and features a circular bottom wall or floor 12 with a cylindrical circumferential outer wall 14 standing upward from the bottom wall 12 around the circular outer perimeter thereof. The circumferential outer wall 14 is perforated by an array of openings 16 that pass through it at regular intervals around a substantial majority of the wall's circumference. An arc-shaped cut-out 18 in the outer wall 14 at one location around sieve's circumference cuts into the outer wall 14 from the top end thereof that lies distal to the bottom wall 12. When the sieve is installed on a self-priming floating pump, the cut-out 18 accommodates a discharge or outlet conduit or pipe of the pump, through which water is discharged radially outward from the pump into a flexible hose that runs to shore from the body of water on which the pump is deployed. The array of openings 16 substantially spans the full circumference of the outer wall, except for the area of the cut-out 18, where the reduced height of the outer wall 14 beneath the cut-out is insufficient to accommodate the openings in the illustrated embodiment.

Depending on the particular outlet conduit size and position of the pump on which the sieve is employed, the cut-out 18 may be omitted in other embodiments, in which case the array of openings 16 may extend the full circumference of the sieve in order to maximize the flow-through area by which water can enter the sieve through these openings in the circumferential outer wall 14. Where a cut-out 18 is included, but sufficient wall height remains below the cut-out 18, openings of the perforated outer wall may be provided at the cut-out area of the outer wall in the portion of the wall that is left intact between the cut-out and the bottom wall. It will be appreciated that the term "cut-out" is used only to describe the absence of wall material at this space, and not to denote that this open space must specifically be formed by "cutting away" a previously present portion of the outer wall. For example, the cut-out may be an ever-present feature of a moulded or vacuum-formed sieve construction.

The bottom wall of the 12 of the sieve features two distinct portions. Firstly, a flat planar outer area 20 of annular shape spans inwardly from a bottom end of the outer wall 14 toward a central axis A that passes perpendicularly through the plane of this flat outer area 20 of the bottom all 12. This flat outer area 20 stops short of the central axis, which, in the illustrated embodiments, defines the center of the cylindrical outer wall 14 and the circular bottom wall 12. The second distinct portion of the bottom wall 12 is a non-planar protuberance 22 that is centered on the axis so as to lie concentric to the outer wall 14 at a radial distance spaced inwardly therefrom across the annular outer area 20 that joins the outer wall 14 to the central protuberance 22. This central location of the protuberance in the illustrated embodiment is particularly intended for use with a pump whose inlet likewise resides centrally of the pump. On a pump employing a sieve of the present invention, the center protuberance should be aligned with the center of the pump's inlet, regardless of the position of the outer wall relative to the protuberance, and regardless of the position of the pump inlet relative to the remainder of the pump.

Figure 2:
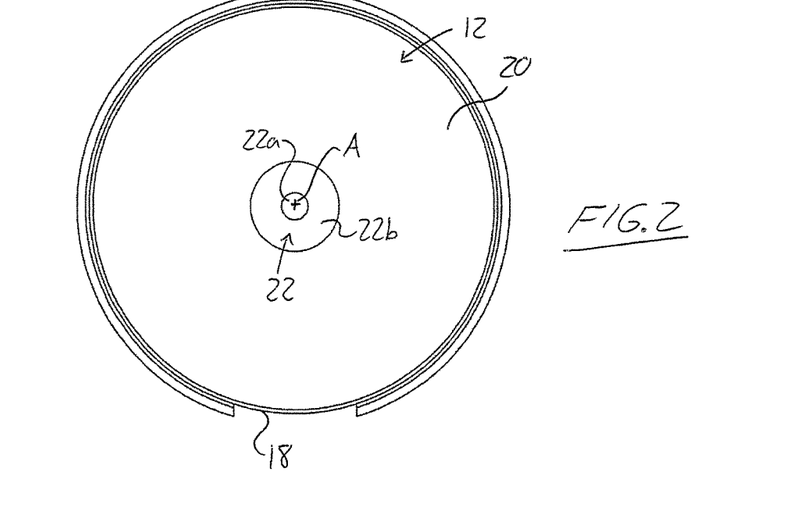
FIG. 2 is an overhead plan view of the inlet sieve of FIG. 1.
Figure 3:
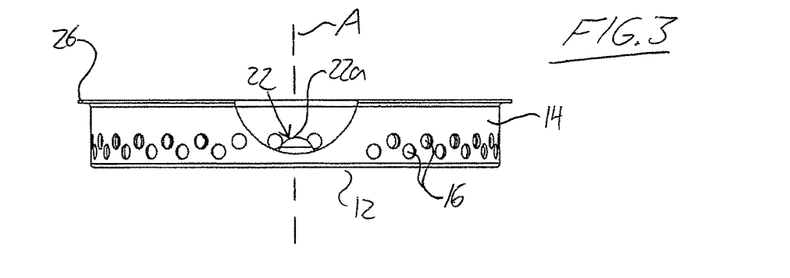
FIG. 3 is a side elevational plan view of the inlet sieve of FIG. 1.
Figure 4:
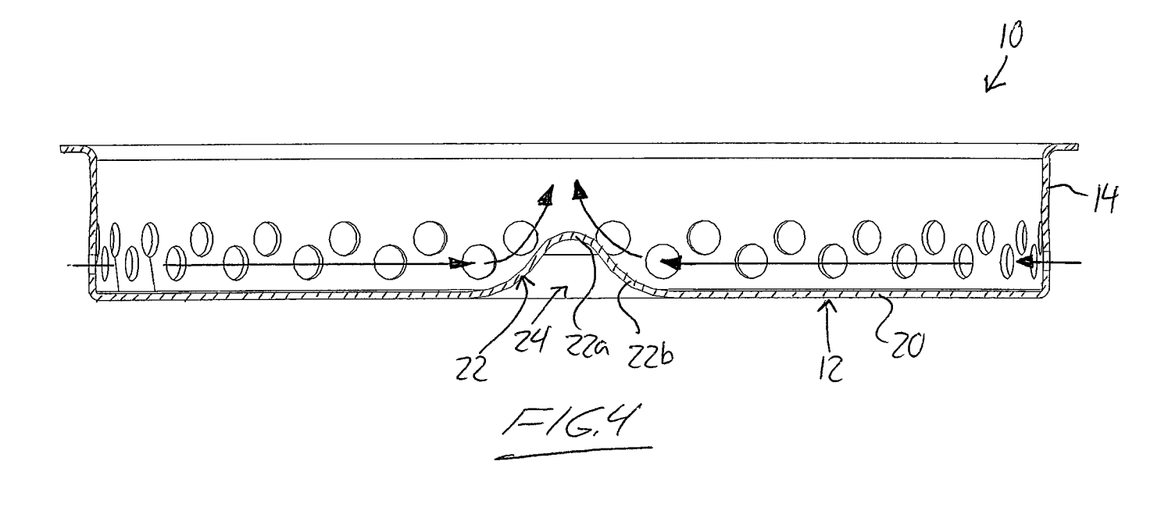
FIG. 4 is a cross-sectional view of the inlet sieve of FIG. 1.

In the embodiment of FIGS. 1 to 3, the protuberance features a convex, frusto-spherical apex 22a that is centered on the axis A and spans less than a full hemispherical area. As best shown in the cross-sectional view of FIG. 4, the protuberance is completed by a concave base portion 22b that provides a smoothly contoured transition between the frusto-spherical apex 22a of the protuberance and the planar outer area 18 of the bottom wall 12. The protuberance is of circularly round cross-section in planes lying normal to the axis A, and features a smooth continuous curvature in all planes containing the axis A. FIG. 4 shows a cross-section of the protuberance in such a diametral plane that contains the axis and lies diametrically thereto, from which it can be appreciated that the protuberance is somewhat bell-shaped, with its cross-section resembling a bell-curve with a somewhat broadened apex.

Figure 5:
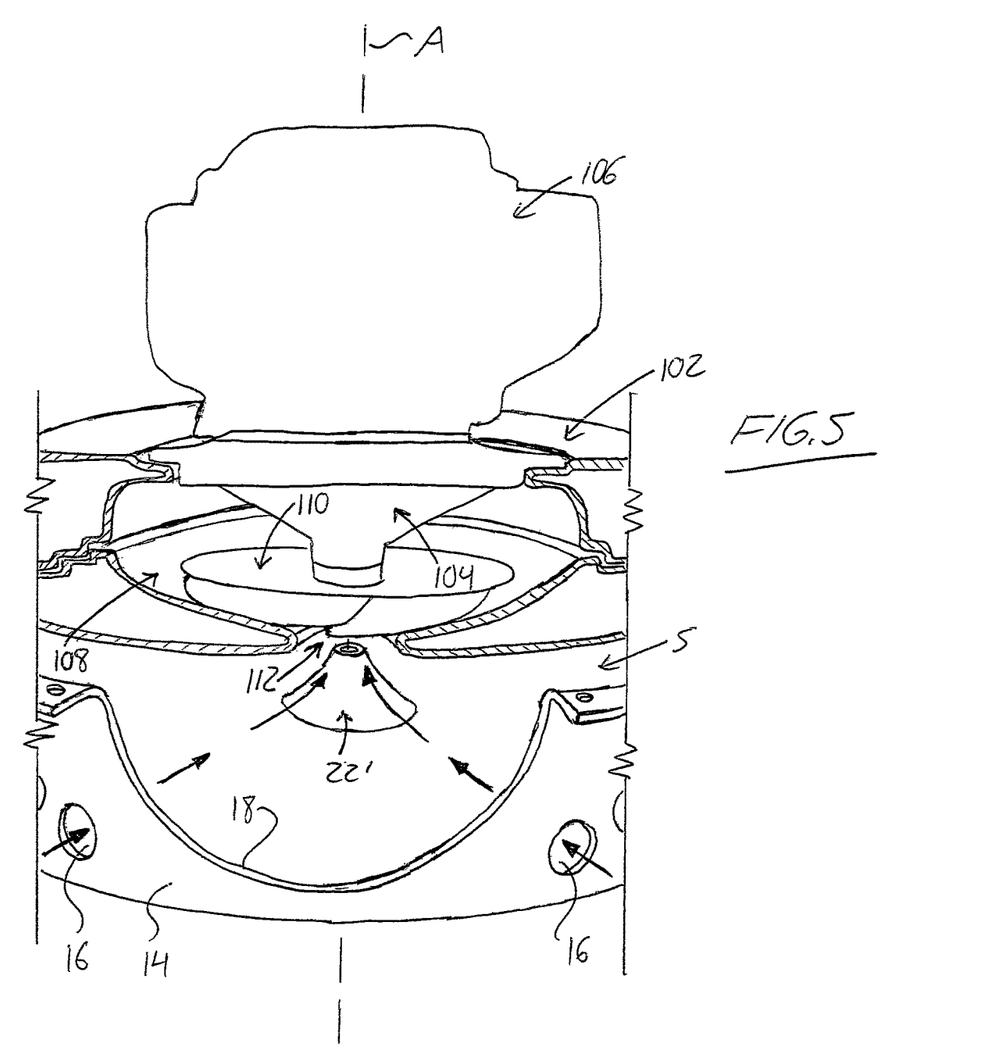
FIG. 5 is a side elevational view of a floating pump incorporating an inlet sieve of a second embodiment of the invention, with a pump body of the floating pump cut away to reveal a positional relationship between a water-guiding protuberance on a bottom wall of the pump and an inlet opening to an impeller chamber of the pump body.

In the embodiment of FIG. 5, instead of a frusto-spherical or dome-like apex like that of the first embodiment, the protuberance 22' features a frusto-conical apex that terminates at the top of the protuberance in a plane that is perpendicular to the axis A and parallel to the outer area 20 of the bottom wall 12. Additionally, the embodiment of FIG. 5 features an axial opening that passes through the bottom wall 12 at the apex of the protuberance, whereby in addition to the radially incoming water flows through the perforations 16 in the outer wall 14, water can also vertically enter the sieve in an upward direction along the axis A.

Figure 6:
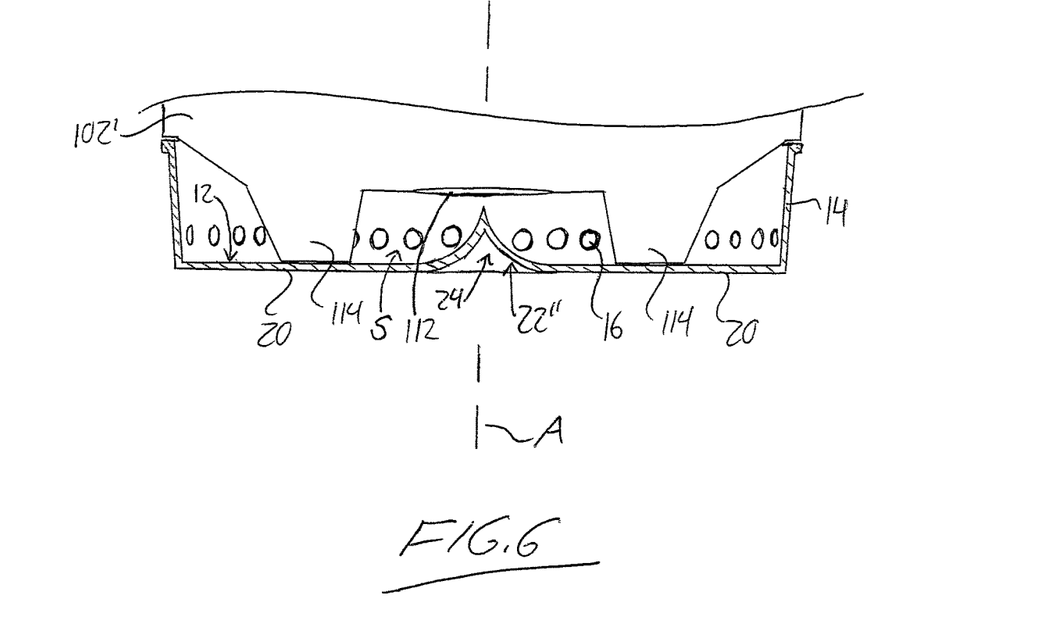
FIG. 6 is a cross-sectional view of an inlet sieve of a third embodiment of the present invention in use on a floating pump that has feet projecting downwardly from an underside of the pump body to sit atop a bottom wall of the sieve.

As a further alternative, the protuberance 22" of the embodiment of FIG. 6 instead terminates in a pointed peak or apex, with no axial through hole. The pointed protuberance 22" maximizes the vertical directionality imparted to the incoming water flows that approach the protuberance from the perforated outer wall 14. However, the flat or spherically contoured top end of the less-pronounced apex in either of the first two embodiments may be advantageous in cases where the shape of the pump and the resulting fit with the sieve do not provide a sufficiently tall space between the bottom wall of the sieve and the underside of the pump body to accommodate the sharply peaked protuberance 22" of FIG. 6.

As shown in the illustrated embodiments, the annular outer area 20 and central protuberance 22 of the bottom wall 12 are preferably seamlessly integral with one another as part of a singular unitary structure of uniform material composition, for example a plastic piece that also integrally defines the outer wall 14 of the sieve as a seamless extension of the outer area 20 of the bottom wall 12. Such a single-piece sieve construction may be accomplished, for example, by rotational moulding or vacuum forming techniques, whereby the protuberance 20, like the outer area of the bottom wall and attached outer circumferential wall, has a thin walled physical structure, and thus defines a hollow interior at the underside of the protuberance, as shown generally at 24 in FIGS. 4 and 6. Alternatively, another plastic moulded embodiment may feature a solid protuberance, where the underside of the protuberance is flush with the underside of the surrounding annular outer portion 20 of the bottom wall 12.

As an alternative to moulded or vacuum-formed plastic, it may be possible to employ metal forming technics to product an integral protuberance at the center of an otherwise flat bottom wall formed of thin metal sheet. In other embodiments, the protuberance may be a separate piece of solid or hollow material fixed in place atop a non-annular circular plate that forms both the outer annular area 20 of the bottom wall and a central support area directly underlying the protuberance. However, integral formation of the protuberance and surrounding remainder of the bottom wall provides for a continuously curved transition between these two portions of the bottom wall for optimally smooth directional change of water as it flows inwardly along the outer area 20 of the bottom wall and is then redirected upward by the protuberance 22. Another option for integral definition of the protuberance is to manufacture the sieve from fibreglass.

Regardless of whether the different portions 18, 20 of the bottom wall 12 are integrally formed with one another or are fastened together from initially separate components, the outer wall 14 may likewise also be an assembled component that is initially separate from the bottom wall before being fixed thereto into the described position standing upright from the perimeter of the bottom plate. It will be appreciated that the described "upright" position of the outer wall is not used to specifically denote that the outer wall must purely cylindrical or must stand truly perpendicular to the bottom wall, as a slightly angled outer wall with suitable openings or perforations would still allow water to pass through it into the space bound inside the outer wall and overlying the bottom wall. The outer wall 14 of the illustrated embodiment features an out-turned flange 26 at its upper end, which serves as an attachment point for connection of the sieve to an underside of a self-priming floating pump.

FIG. 5 illustrates use of the sieve 10 on a self-priming floating pump 100, which features an annular or ring-shaped pump body 102 that includes a built in float, such as a foam filled or hollow air-filled float. A gas-powered motor 106 is mounted atop the pump body 102, and a transmission of the pump features a gearbox 104 resides beneath the motor in a hollow impeller chamber 108 that is defined and surrounded by the annular form of the pump body 102. Within the impeller chamber 108, an output shaft of the transmission extends downward from the gearbox 104 and rotatably carries an impeller 110 inside the hollow chamber 108 of the pump body 102. As an alternative to a gas powered motor, the pump may feature another rotatory power source, such as an electric or hydraulic motor, in which case the impeller may be directly driven by the motor driveshaft without an intervening gearbox or other transmission. The hollow chamber 108 features an inlet opening 112 at a bottom end thereof, through which water is drawn upwardly into the impeller chamber 108 during use of the pump. As with conventional self-priming floating pumps, the buoyancy of the pump maintains the motor 106 above the water surface level L when the pump is placed on a body of water, while the impeller chamber 108 resides below water level in a submerged condition, whereby placement of the pump 100 onto a body of water will automatically prime the pump by filling the impeller chamber 108 with water.

During assembly of the pump prior to its introduction to the body of water, whether during manufacture of the pump or aftermarket installation of the sieve as a substitution for a conventional sieve, the sieve 10 is attached to the pump by fastening the out-turned flange 26 at the top end of the outer wall 14 to an underside of the pump body 102 at a circumferential area thereof spanning around the inlet opening 112 at the bottom of the impeller chamber 108. Alternatively, the sieve may be installed without the use of a flange, by any of a number of suitable attachment methods, for example by fastening the outer wall of the sieve to an outer circumference of the pump body.

As shown in FIG. 6, the pump may have feet 114 that protrude downward from the underside of the pump body 102' at locations radially outward from the pump inlet 112 in order to stand atop the outer area 20 of the bottom wall 12 of the sieve at spaced apart positions around the protuberance 22". This way, these feet 114 bear the weight of the pump when the sieve is seated on the ground, thus avoiding the need to provide the outer wall of the sieve with sufficient structural integrity to support the weight of the pump. The bottom wall 12 of the installed sieve resides at a position underlying the pump 100, particularly with the axis A of the sieve aligned with the rotational axis of the impeller 110 and the driveshaft thereof (i.e. motor driveshaft or transmission output shaft), whereby the protuberance 22 resides centrally under the inlet opening 112 of the impeller chamber 108. A space S bound between the bottom wall 12 of the sieve 10 and the underside of the pump body 102 is accessible by the surrounding water through the openings 16 in the outer wall 14 of the sieve.

As shown with solid-headed arrows in FIG. 5, when the pump impeller 110 of the pump is driven by the motor 106, thus forcing the initial pump-priming volume of water in the impeller chamber 108 out through the discharge or outlet conduit or pipe of the pump, more water is drawn into the space S through the perforated outer wall 14 of the sieve, where this incoming water then continues radially inward from the perforated wall 14 over the outer portion 20 of the bottom wall 12 toward the central protuberance 22 at the axis A, where the continuously curved transition from the outer area 20 of the bottom wall to the protuberance 22 acts to smoothly redirect the water upwardly into the inlet opening of the pump's impeller chamber 108. In the particular embodiment of FIG. 5, water also flows upwardly through the bottom wall 12 via the axial opening in the apex of the protuberance 22', which aids in inducing the upward directional change of the incoming radial in order to encourage the same upwardly into the impeller chamber 108 of the pump 100.

The rounded shape of the protuberance around the axis A enables the inward flow of water at any and all radial positions around the axis to experience this smooth, upward redirection. This may reduce the motor energy required to change the direction of the incoming water, as the contoured shape of the protuberance will guide the fluid upward, whereby the pump no longer relies solely on the water-drawing power of the impeller to achieve this change in direction. The protuberance may also reduce turbulence compared to purely flat-bottom sieve configurations in which mixing or impact of these different incoming radial streams of water may cause swirling or turbulence that reduces the smooth uptake of water into the impeller chamber, with potential detriment to the pump's performance.

It will be appreciated that the protuberance 22 need not necessarily have a flow transition surface that spans a full 360-degree circumference around the axis. For example, the cut-out area 18 of the outer wall 14 of the illustrated embodiments is occupied by the discharge or outlet conduit or pipe of the pump during use of the sieve 10, and thus does not experience a respective radial stream of incoming water flow, and so the protuberance may not necessarily require a smooth flow transition surface facing the radial direction in which the cut-out 18 resides relative to the axis A. However, in some embodiments, each opening 16 in the outer wall 14 is faced by a same curvature of the protuberance in a plane that contains the central axis A and bisects that opening. This is shown for example in FIG. 4, where diametrically opposing openings in the outer wall 14 are present in the diametral plane in which the sieve has been cross-sectioned, and these aligned openings face opposing sides of the protuberance that share a symmetrically-matching curvature or slope profile in this plane.

In the illustrated embodiments, where the perforated outer wall is cylindrical and centered on the same axis as the protuberance, this same curvature or slope profile of the protuberance faces each and every one of the openings 16 in the outer wall in the diametral plane that bisects the respective opening. Even in other embodiments where the outer wall is not round, or the protuberance is not concentric with the outer wall (i.e. where the axis A of the protuberance is not at the center of a circular outer wall), preferably the curvature or slope profile of the protuberance is identical in at least a plurality, and more preferably all, of the diametral planes of the axis A.

While the illustrated embodiment features holes that are moulded or cut into an otherwise solid outer wall 14, other embodiments may employ a mesh or screen material for the outer wall material. Also, the outer portion 20 of the bottom wall 12 of the sieve need not necessarily be planar, and for example could slope upwardly at a slight angle moving inwardly from the outer wall 14 until it reaches the protuberance, at which the incline or slope of the bottom wall would increase to a greater angle toward the apex of the protuberance at the central axis A. The bottom plate and outer wall may deviate from the described circular and cylindrical shapes, and the axis A need not necessarily be central of the sieve so long as it resides in alignment with the inlet of the pump when installed thereon in order to help impart smooth uptake of liquid thereinto from the body of water or other liquid.

Since various modifications can be made in my invention as herein above described, and many apparently widely different embodiments of same made within the scope of the claims without departure from such scope, it is intended that all matter contained in the accompanying specification shall be interpreted as illustrative only and not in a limiting sense.

The invention claimed is:

1. An inlet sieve for a self-priming floating pump, the inlet sieve comprising:
   a bottom wall; and
   a perforated outer wall upstanding from a topside of the bottom wall and extending about a central axis that passes through the bottom wall;
   wherein the topside of the bottom wall comprises a non-perforated outer area joined to and spanning inwardly from the perforated outer wall toward the central axis, and a protuberance that bulges upwardly from the outer area to place an apex of the protuberance in an elevated location relative to the outer area of the bottom wall at a position situated at the central axis and spaced across said outer area from the perforated outer wall, said protuberance having a non-perforated base portion that joins with and slopes upwardly from the outer area of the topside of the bottom wall to the apex, whereby the non-perforated outer area of the topside of the bottom wall enables radially inward flow of liquid thereover from openings in the perforated outer wall toward the protuberance, at which the non-perforated base of the protuberance then guides the radially inward flow of liquid upwardly to the apex of the protuberance; and
   wherein the non-perforated outer area spans a majority of a radial distance from the perforated outer wall to the central axis, and the base of the protuberance joins concavely with, and slopes concavely upwardly from, the outer area of the topside of the bottom wall at a location closer to said central axis than to said perforated outer wall, whereby a concave curvature of the base portion of the protuberance at said location closer to the central axis provides a smooth, continuously curved transition from the outer area of the topside of the bottom wall to redirect said radially inward flow of liquid upwardly at said location closer to the central axis.

2. The inlet sieve of claim 1 wherein the outer area of the topside of the bottom wall and the protuberance thereof are seamlessly integral with one another.

3. The inlet sieve of claim 1 wherein the protuberance is circular in shape around the axis.

4. The inlet sieve of claim 1 wherein an outer circumference of the protuberance spans 360-degrees about the central axis.

5. The inlet sieve of claim 1 wherein a cross-section of the protuberance is identical in each of a plurality of diametral planes of the central axis.

6. The inlet sieve of claim 5 wherein the cross-section of the protuberance is identical in each and every diametral plane of the central axis.

7. The inlet sieve of claim 1 wherein a slope profile of the protuberance facing outwardly away from the central axis on opposing sides thereof is identical in each of a plurality of diametral planes of the central axis.

8. The inlet sieve of claim 7 wherein the slope profile of the protuberance is identical in each and every diametral plane of the central axis.

9. The inlet sieve of claim 1 wherein the bottom wall has an axial opening therein at the apex of the protuberance.

10. The inlet sieve of claim 1 wherein the topside of the bottom wall, at all areas thereof between the perforated outer wall and the apex of the protuberance, is free of any openings.

11. The inlet sieve of claim 1 wherein the outer area of the topside of the bottom wall is a flat planar surface lying perpendicular to the central axis.

12. In combination with a self-priming floating pump having a pump body and an inlet opening at an underside thereof that communicates with an impeller chamber of the pump to draw liquid into and through the impeller chamber under operation of the pump when floating in a body of said liquid, an inlet sieve comprising:
  a bottom wall; and
  a perforated outer wall upstanding from a topside of the bottom wall and extending about a central axis that passes through the bottom wall;
  wherein the inlet sieve is connected or connectable to the pump in a position placing the bottom wall beneath the inlet opening of the pump at a distance therebelow with the inlet opening of the pump aligned with the central axis, whereupon openings in said perforated outer wall enable liquid to flow into a space bound between the bottom wall of the inlet sieve and the underside of the self-priming floating pump for uptake of said liquid into the inlet opening of the self-priming floating pump;
  wherein the topside of the bottom wall of the inlet sieve comprises a non-perforated outer area joined to and spanning inwardly from the perforated outer wall toward the central axis, and a protuberance that bulges upwardly from the outer area to place an apex of the protuberance in an elevated location relative to the outer area of the bottom wall at a position that is situated at the central axis and spaced across said outer area from the perforated outer wall, said protuberance having a non-perforated base portion that joins with and slopes upwardly from the outer area of the topside of the bottom wall to the apex, whereby the liquid flowing into the space between the bottom wall and the underside of the self-priming floating pump through openings in the perforated outer wall comprises a radially inward flow of liquid over the non-perforated outer area of the topside bottom wall of the inlet sieve and-is-then-guided which is then redirected upwardly toward the inlet opening of the self-priming floating pump by the non-perforated base portion of the protuberance of the bottom wall of the inlet sieve; and
  wherein the non-perforated outer area spans a majority of a radial distance from the perforated outer wall to the central axis, and the base of the protuberance joins concavely with, and slopes concavely upwardly from, the outer area of the topside of the bottom wall at a location closer to said central axis than to said perforated outer wall, whereby a concave curvature of the base portion of the protuberance at said location closer to the central axis provides a smooth, continuously curved transition from the outer area of the topside bottom wall to redirect said radially inward flow of liquid upwardly toward the pump inlet at said location closer to the central axis.

13. The combination of claim 12 wherein the topside of the bottom wall, at all areas thereof between the perforated outer wall and the apex of the protuberance, is free of any openings.

14. The combination of claim 12 wherein the bottom wall has an axial opening therein at the apex of the protuberance.

15. The pump of claim 12 wherein the outer area of the topside of the bottom wall is a flat planar surface lying perpendicular to the central axis.

16. In a self-priming floating pump having a pump body and an inlet opening at an underside thereof that communicates with an impeller chamber of the pump to draw liquid into and through the impeller chamber under operation of the pump where floating in a body of said liquid, an inlet sieve comprising:
  a bottom wall in a position underlying the inlet opening of the self-priming floating pump of at a distance therebelow with the inlet opening of the self-priming floating pump aligned with a central axis that passes through said bottom wall; and
  a perforated outer wall upstanding from a topside of the bottom wall and extending about the central axis,
  wherein the topside of the bottom wall comprises a non-perforated outer area joined to and spanning inwardly from the perforated outer wall toward the central axis, and a protuberance that bulges upwardly from the outer area to place an apex of the protuberance in an elevated location relative to the outer area of the topside of the bottom wall at a position situated on the central axis and spaced across said outer area from the perforated outer wall, said protuberance having a non-perforated base portion that joins with and slopes upwardly from the outer area of the topside of the bottom wall to the apex, whereby the non-perforated outer area of the topside of the bottom wall enables radially inward flow of liquid thereover from openings in the perforated outer wall toward the protuberance, at which the non-perforated base of the protuberance then guides the radially inward flow of liquid upwardly to the apex of the protuberance; and
  wherein the non-perforated outer area spans a majority of a radial distance from the perforated outer wall to the central axis, and the base of the protuberance joins concavely with, and slopes concavely upwardly from, the outer area of the topside of the bottom wall at a location closer to said central axis than to said perforated outer wall, whereby a concave curvature of the base portion of the protuberance at said location closer to the central axis provides a smooth, continuously curved transition from the outer area of the topside of the bottom wall to redirect said radially inward flow of liquid upwardly at said location closer to the central axis.

17. The pump of claim 16 wherein the topside of the bottom wall, at all areas thereof between the perforated outer wall and the apex of the protuberance, is free of any openings.

18. The pump of claim 16 wherein the bottom wall has an axial opening therein at the apex of the protuberance.

19. The pump of claim 16 wherein the outer area of the topside of the bottom wall is a flat planar surface lying perpendicular to the central axis.

* * * * *